United States Patent
Heo et al.

(10) Patent No.: US 9,063,731 B2
(45) Date of Patent: Jun. 23, 2015

(54) ULTRA LOW POWER APPARATUS AND METHOD TO WAKE UP A MAIN PROCESSOR

(75) Inventors: Changryong Heo, Gyeonggi-do (KR); Kenhyung Park, Gyeonggi-do (KR); Kiyeon Park, Gyeonggi-do (KR); Yongyi Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 239 days.

(21) Appl. No.: 13/595,119

(22) Filed: Aug. 27, 2012

(65) Prior Publication Data

US 2014/0059365 A1    Feb. 27, 2014

(51) Int. Cl.
   G06F 1/32    (2006.01)

(52) U.S. Cl.
   CPC .......... G06F 1/3206 (2013.01); G06F 1/3209 (2013.01); G06F 1/3215 (2013.01); G06F 1/3293 (2013.01); Y02B 60/121 (2013.01)

(58) Field of Classification Search
   CPC ... G06F 1/3293; G06F 1/3287; G06F 1/3243; G06F 1/3231
   USPC .......................................... 713/320, 323, 324
   See application file for complete search history.

(56) References Cited

U.S. PATENT DOCUMENTS

| | | | |
|---|---|---|---|
| 7,176,902 B2 * | 2/2007 | Peterson et al. | 345/173 |
| 7,633,076 B2 | 12/2009 | Huppi et al. | |
| 8,072,379 B2 | 12/2011 | Gopinath | |
| 8,145,053 B2 | 3/2012 | Sakurai | |
| 8,230,246 B1 * | 7/2012 | Sharkey | 713/320 |
| 8,706,172 B2 * | 4/2014 | Priyantha et al. | 455/574 |
| 2002/0180724 A1 | 12/2002 | Oshima et al. | |
| 2003/0040339 A1 | 2/2003 | Chang | |
| 2003/0177402 A1 * | 9/2003 | Piazza | 713/300 |
| 2007/0140199 A1 | 6/2007 | Zhao et al. | |
| 2009/0135751 A1 | 5/2009 | Hodges et al. | |
| 2009/0259865 A1 | 10/2009 | Sheynblat et al. | |
| 2009/0278738 A1 | 11/2009 | Gopinath | |
| 2010/0013778 A1 * | 1/2010 | Liu et al. | 345/173 |
| 2010/0235667 A1 * | 9/2010 | Mucignat et al. | 713/323 |
| 2010/0302028 A1 | 12/2010 | Desai et al. | |
| 2010/0306711 A1 * | 12/2010 | Kahn et al. | 715/863 |

(Continued)

FOREIGN PATENT DOCUMENTS

EP    2 482 167 A1    8/2012
JP    2011-139301 A    7/2011

(Continued)

*Primary Examiner* — Vincent Tran
(74) *Attorney, Agent, or Firm* — Cha & Reiter, LLC.

(57) ABSTRACT

An apparatus and method for waking up a main processor (MP) in a low power or ultra-low power device preferably includes the MP, and a sub-processor (SP) that utilizes less power than the MP to monitor ambient conditions than the MP, and may be internalized in the MP. The MP and SP can remain in a sleep mode while an interrupt sensor monitors for changes in the ambient environment. A sensor is preferably an interrupt-type sensor, as opposed to polling-type sensors conventionally used to detect ambient changes. The MP and SP may remain in sleep mode, as a low-power or an ultra-low power interrupt sensor operates with the SP being in sleep mode, and awakens the SP via an interrupt indicating a detected change. The SP then wakes the MP after comparing data from the interrupt sensor with values in storage or with another sensor.

39 Claims, 9 Drawing Sheets

(56) References Cited

U.S. PATENT DOCUMENTS

| | | |
|---|---|---|
| 2010/0313050 A1 | 12/2010 | Harrat et al. |
| 2011/0071759 A1 | 3/2011 | Pande et al. |
| 2011/0077865 A1* | 3/2011 | Chen et al. ............... 702/3 |
| 2011/0162894 A1* | 7/2011 | Weber ............... 178/19.03 |
| 2012/0096290 A1 | 4/2012 | Shkolnikov et al. |
| 2012/0100895 A1 | 4/2012 | Priyantha et al. |
| 2012/0154292 A1* | 6/2012 | Zhao et al. ............... 345/173 |
| 2013/0082939 A1* | 4/2013 | Zhao et al. ............... 345/173 |
| 2014/0025973 A1* | 1/2014 | Schillings et al. ............ 713/323 |
| 2014/0049480 A1* | 2/2014 | Rabii ............... 345/173 |

FOREIGN PATENT DOCUMENTS

| | | |
|---|---|---|
| KR | 10-0748984 B1 | 8/2007 |
| KR | 10-2010-0061894 A | 6/2010 |
| KR | 10-2011-0071216 A | 6/2011 |

\* cited by examiner

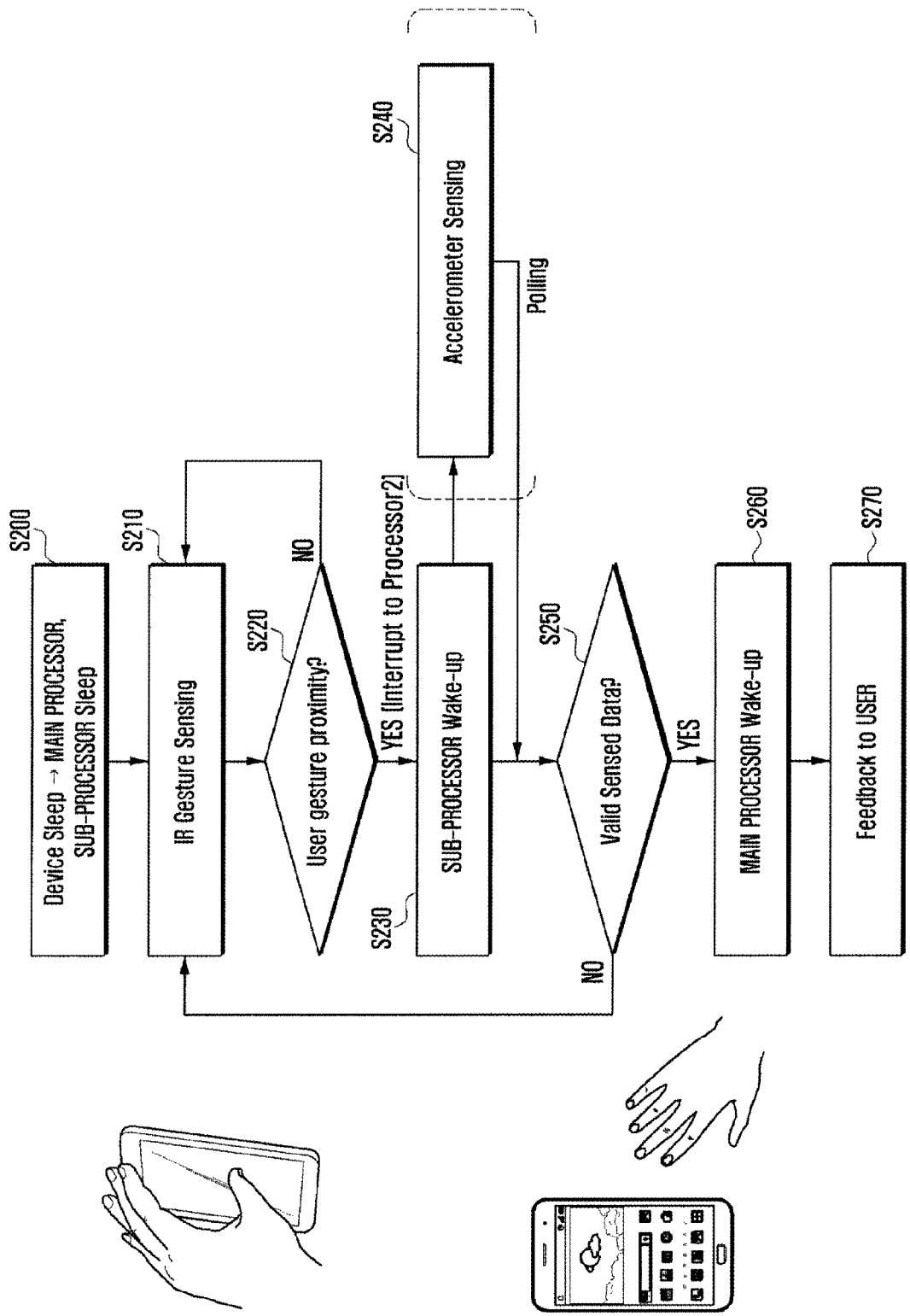

FIG. 3C

AP ↔ Sensor Hub Protocol - Message Frame

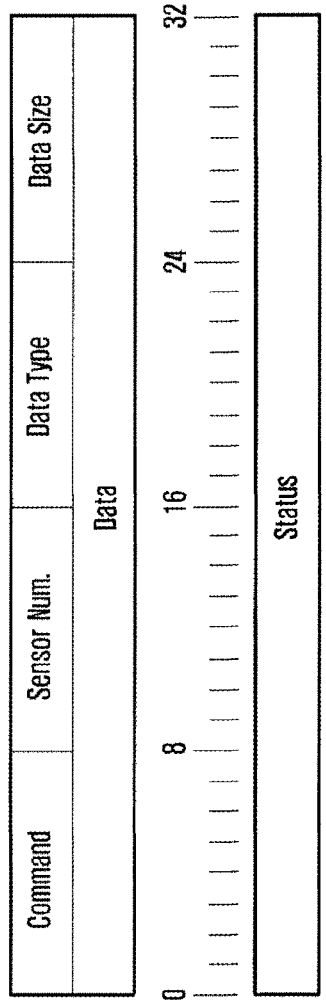

| Field | Size | Description |
|---|---|---|
| Command | 1byte | operation commanded by the AP to the Hub |
| Sensor Num. | 1byte | sensor number field specifying a particular sensor |
| Data Type | 1byte | shows the content of the operand being transmitted |
| Data Size | 1byte | size of the actual data that follows |
| Data | 4byte | the actual operand |
| Status | 4byte | current status information of AP/Hub |

ULTRA LOW POWER APPARATUS AND METHOD TO WAKE UP A MAIN PROCESSOR

BACKGROUND OF THE INVENTION

1. Field of the Invention

The present invention relates to a low-power wake-up method for an electronic device having a sensor. More particularly, the present invention relates to ways to reduce battery power utilized by portable devices and facilitate a return of the electronic device to operation from a sleep mode.

2. Description of the Related Art

In order to save power, which is of particular importance to battery powered devices, conventionally a "sleep mode" has been utilized, typically when the electronic device is an idle state for a predetermined amount of time.

Battery usage in portable electronic devices, including but not limited to cell phones, smart phones, tablets, personal digital assistants (PDA's), portable music players, etc., are just a few of the many types of devices where battery usage is critical, and there continues to be a need to provide more functionality and at the same time reduce power battery usage.

Conventional devices, wherein after a period of time of non-usage, may dim the brightness of the display, or the display goes blank to conserve energy.

For example, with regard to computers, sleep mode is defined as an energy-saving standby condition of a computer which can be reactivated by external stimulus, such as touching the keyboard. For example, when a notebook computer goes into sleep mode, the display screen and disk drive are normally shut down. Once awakened (i.e. sent a specific signal), the computer returns to its former operating status.

Moreover, in the case of portable electronic devices, sleep mode operates, for example, in devices that are in no way limited to smartphones, tablets, music players, Personal Digital Assistant (PDAs), just to name a few possibilities.

In fact, many smartphones now default to a sleep mode when not used, unless actively performing certain tasks. When there are no active user interactions such as screen touches, every component, including the central processor, can stays off unless an app instructs the operating system to keep the device fully powered on.

Moreover, a number of background operations need to be performed while the phone is idle. In one such example, a mailer may need to automatically update email by checking with a remote server. To prevent the phone from going to sleep during such operations, smartphone manufacturers often make application programming interfaces, or APIs, available to app developers. The developers insert the APIs into apps to instruct the phone to stay awake long enough to perform necessary operations.

In a typical smartphone, an Application Processor (AP) is asleep when the device is asleep. In order to wake up the device, conventional systems require the user to press a power button or an unlock button.

Sleep mode saves battery power, particularly when compared with leaving a device in fully operation state while idle, and advantageously permits the user to avoid having to reset programming codes or wait for an electronic device to reboot. In wireless electronic devices, such as portable mobile terminals, tablets, etc., which often seek out networks and have to provide passwords to obtain access upon being rebooted or reset, the use of sleep mode is preferable to a rather cumbersome and slow process or rebooting.

However, to return to an operational mode from a sleep mode (wake mode) requires an action to be undertaken by the user. For example, a power button or an unlock icon must be pressed, which is slow and sometimes awkward, especially when trying to quickly perform an action on the electronic device. Even in the case of a virtual keypad, an unlock icon must be touched or spread in order to restore the electronic device to an operational mode, meaning that the user is inconvenienced by contacting a button of the device, or sliding their finger along a screen.

Some conventional attempts to solve some of the shortcomings include providing a luminance sensor or a camera. However, in such cases the application processor (AP) cannot go into sleep mode and must always be in an operating mode to process sensed data from the sensor or camera. This type of monitoring requires a high amount of power consumption, as it is impossible to control the sensor by the AP directly when the AP is asleep.

Recently, the use of a lower power processor for processing only the sensing data has been configured into the devices. However, the low power processor processes data from the sensor using a polling type, and must be maintained in a wake-up state, using significant amounts of power.

With regard to conventional attempts to address the above-discussed issues, U.S. Pat. Appln. Pub. No. 20100313050 discloses that a sensor processor system selects a power profile to be applied to the application processor system based on the sensed data, and instructs the power management controller to apply the selected power profile to the application processor system. There are two processors used for low power sensing that wakes up the AP when the sensed data meets the condition.

However, a significant drawback to U.S. Pat. Appln. Pub. No. 2010/0313050 is that the sensor processor always operates to monitor ambient environment using a polling type sensor without a sleep mode. The sensor processor applies the power profile to the application processor system (S/W type).

In another conventional attempt to improve the art, in U.S. Pat. Appln. Pub. No. 2009/0259865, the electronic device includes a circuit configured to operate when the main processor is in the sleep mode. The circuit comprises at least one low power processor and a sensor. However, the low power processor in the conventional system always operates without being in sleep mode in order to be able to monitor ambient environment via a polling-type sensor.

Accordingly, there is a need in the art for a system and method that permits additional components to be in sleep mode and yet, provides ambient monitoring of the device, and can permit a switch back to an operating mode from sleep mode quickly without pressing buttons or touching the display screen.

SUMMARY OF THE INVENTION

The summary of the invention is not to be used as a basis to interpret a scope of the appended claims, as the claimed invention is far broader than the description in this summary.

An apparatus and method for waking up a main processor in an ultra-low power device preferably includes a main processor, and a sub-processor that utilizes less power than the main processor, and may be internalized in the main processor. According to an exemplary aspect of the presently claimed invention, at least one sensor is preferably an interrupt-type sensor (as opposed to, for example, a polling-type sensor). One of the many advantages of the presently claimed invention is that both the main processor and the sub-processor can remain in sleep mode, as a low-power or an ultra-low power sensor can operate with the sub-processor being in sleep mode and only awaken after receiving an interrupt signal from the interrupt sensor that a change has been detected.

In addition, the presently claimed invention also permits a return from sleep mode to operating mode by a mere wave of the hand, which is unknown heretofore. Also, shaking the unit, or moving a stylus pen arranged along an exterior of the device are all examples of the many ways the device can be awakened from sleep mode.

BRIEF DESCRIPTION OF THE DRAWINGS

The above and other exemplary aspect of the invention will become more apparent from the following detailed description taken in conjunction with the accompanying drawings, in which:

FIG. 2 shows a flowchart illustrating an exemplary operation for gesture sensing according to an exemplary aspect of the invention;

FIG. 3C is an example of a message frame that can be used with an AP to Hub Protocol according to an illustrative aspect of the present invention;

Figure 1:
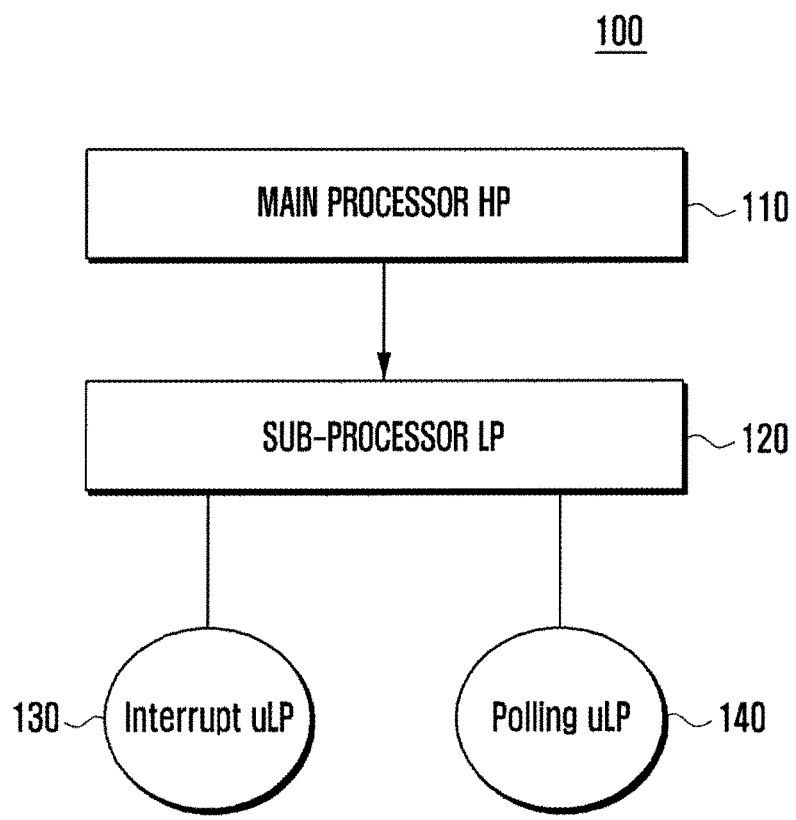
FIG. 1 shows a block diagram of an exemplary depiction of an apparatus according to an exemplary aspect of the invention.

It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and at least one of a low power processor and an ultra-low power sensor to monitor at least one of the signals, commands, inputs, and changes in the environment. The circuit wakes up the main processor responsive to one of the low power processor and the ultra-low power interrupt sensor.

DETAILED DESCRIPTION

The present invention has been described with respect to particular exemplary embodiments and with reference to certain drawings, but the invention is not limited thereto, but rather, is set forth only by the appended claims. The drawings described are only schematic and are non-limiting. In the drawings, for illustrative purposes, the size of some of the elements may be exaggerated and not drawn to a particular scale. Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, if used in the description and in the claims, are provided for distinguishing between similar elements and not necessarily for describing a sequential or chronological order. It is to be understood that the terms so used are interchangeable under appropriate circumstances (unless clearly disclosed otherwise) and that the exemplary embodiments of the invention described herein and may be operated in other sequences and/or arrangements than are described or illustrated herein.

DEFINITIONS

To aide in an understanding of the present invention, an artisan should understand and appreciate that the terms "main processor" and sub-processor" are terminologies used for understanding of the invention, but other terminologies can be interchangeably used in place of main processor and sub-processor having the same meaning.

For example, to aid the artisan, the term "main processor", can be any one of an "application processor", "AP", "first processor", and "processor 1" as used herein all refer to the same processor 110 that is shown in FIG. 1. A high power processor can be referred to as a main processor, or an application processor. The main processor typically is considered high power relative to the low power sub-processor or sensing processor.

In addition, the term "sub-processor", can be any one of a "sensing processor", "MCU", "second processor", "processor 2", "Sensor Hub (Processor)", MCU (Micro Controller Unit", I refer to the same processor 120 that is shown in FIG. 1. An ultra-low power processor can be referred to as any of the above.

An artisan understands and appreciates that the term "ultra-low power" typically refers to a processor operating at power consumption values using less than approximately 1 mA, and often in the μA range. "Ultra-low power levels" refers to power consumption at levels using less than approximately 1 mA.

In addition, the artisan also understands and appreciates that the term "low power" typically refers to a processor (or sub-processor) operating in the 1-10 mA range. The apparatus may comprise a wireless communication device, such as a mobile communication terminal, a cellphone, smart phone, tablet, Personal Digital Assistant (PDA), notebook, netbook, etc. just to name a few possible non-limiting examples of devices.

FIG. 1 shows a block diagram of an exemplary depiction of an apparatus 100 according to an exemplary aspect of the invention that includes a main processor (HP for high power) that is typically an application processor, a sub-processor 120 (LP for low power) that receives information from sensors such as interrupt uLP sensor 130 (ultra-low power) and a polling 140 (that may or may not be ultra-low power).

The sub-processor 120 operates at a low power or ultra-low power, and according to the present invention, the sub-processor can remain in a sleep mode along with the main processor 110 because of the use of an interrupt sensor 130. As discussed herein above, the conventional apparatus uses only a polling sensor that requires either the main processor or the sub-processing to remain fully operational to be able to have the device change from sleep mode to operational mode.

The interrupt sensor 130 operates at ultra-low power levels and sends an interrupt signal to the sub-processor 120 when a predetermined condition is sensed, which can be, for example, waiving one's hand in front of the display, shaking the device, or moving a piece of the device, such as shifting a position of a stylus 475 (FIG. 4) or part of the cover. According to the present invention, the interrupt sensor 130 is operable while the sub-processor 120 is in sleep mode. However, the polling sensor 140 requires the sub-processor to be in awake mode or operating mode (not in sleep mode).

FIG. 2 shows a flowchart illustrating an exemplary operation for gesture sensing according to an exemplary aspect of the invention.

At step 200, the main processor 110 and sub-processor 120 are in sleep mode. At steps 210 and 220, an interrupt sensor 130 (including but not limited to an infrared (IR) sensor) detects gesture sensing within a proximity distance of the electronic device, typically a display or touchscreen. The proximity distance can be, for example, 10-15 cm, but the invention does not require a specific distance, so long as the sensor can recognize the wave of the user's hand.

At step 230, the sub-processor 120 is awakened by the interrupt signal sent from the interrupt sensor 130. Alternatively, at step 240 an accelerometer may detect the device being shaken or waived, and also cause the sub-processor 120 to be awakened.

At step 250, the sub-processor determines whether or not the sensed data from the interrupt sensor 130 is valid by comparing the value with a table in storage.

In addition, a polling sensor 130 can be optionally included so that when the mobile device is placed in a case or bag, the interrupt sensor does not unintentionally operate. Accordingly, the sub-processor wakes up due to the interrupt from the interrupt sensor, and the main processor wakes up when 1) sensing data of the interrupt sensor is within valid range or 2) when sensing data of the polling sensor is within the valid range, with 1) or 2) being determined by the sub-processor at step 250.

After determining by the sub-processor 120 that the data is valid, for example, by being in a valid range, or has reached a predetermined threshold, the sub-processor 120 at step 260 then wakes the main processor 110, which in turn at step 270 provides feedback to the user, in the form of, for example, unlocking the screen, prompting the user, making the display operable, showing a home screen, etc. According to an exemplary aspect of the present invention, the predetermined threshold could be a particular value which if the output is greater than or equal to, is determined by the sub-processor as satisfying the wake up condition(s). In addition, there can be a range of range of values received from the sensor that are predetermined as satisfying a wakeup condition, that being provided only for purposes of illustration and not for limiting the appended claims, such as, for example a microvolt uv (or microamp ua) range. Any other such range (e.g. ma) that is within the capability of the sub-processor to distinguish between values received from the sensor so as ascertain a valid range or predetermined threshold are within the spirit and scope of the claimed invention.

Figure 3A:
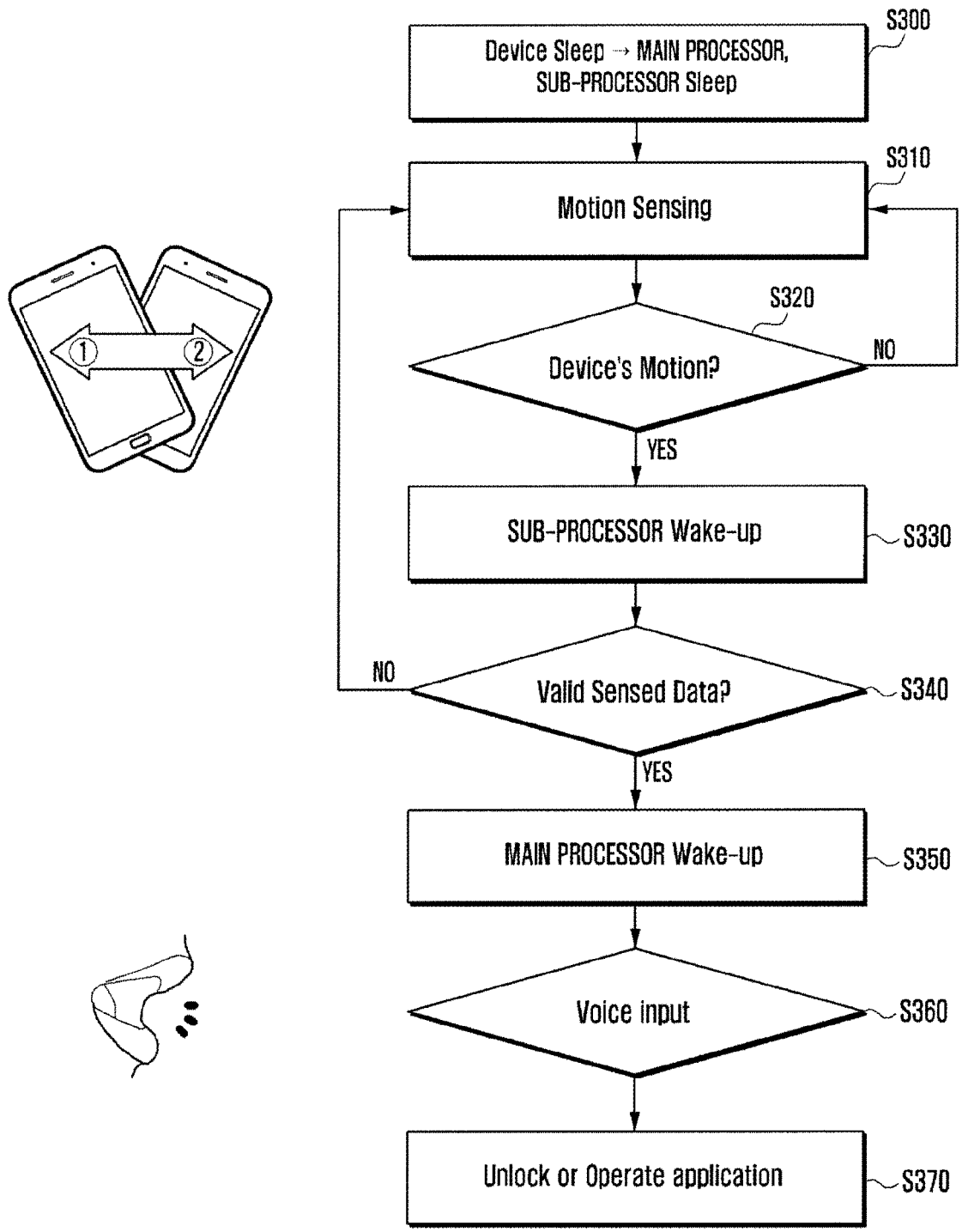
FIG. 3A shows a flowchart illustrating an exemplary operation of a feedback voice input based on device's motion according to an exemplary aspect of the invention.

FIG. 3A shows a flowchart illustrating an exemplary operation of a feedback voice input based on device's motion according to an exemplary aspect of the invention. This particular exemplary embodiment starts at step 300 with the main processor and sub-processor being asleep. A motion detector detects motion at step 310, by sensing the predetermined condition (in this example is the device being shaken or waved) at step 320, and the interrupt signal is sent to the sub-processor 120 to wake up the sensing processor at step 330. Then the sub-processor at step 340 determines whether or not the sensed data is valid, by comparing with values in storage to determine if the data is within a valid range or has reached a predetermined threshold, for example. Upon determining that the sensed data from the interrupt sensor is valid, then at step 350 the sub-processor 120 wakes up the main processor 110. The main processor can be fully operable and wait, for example, for a voice input (step 360), and based on the determined voice input, can either unlock the display screen or execute a function or application (step 370). For further purposes of illustration and not to limit the claimed invention, exemplary protocol between the main processor and sub-processor is discussed herein. The protocol for transmitting is in accordance with the main processor and sub-processor's active or sleep state.

Figure 3B:
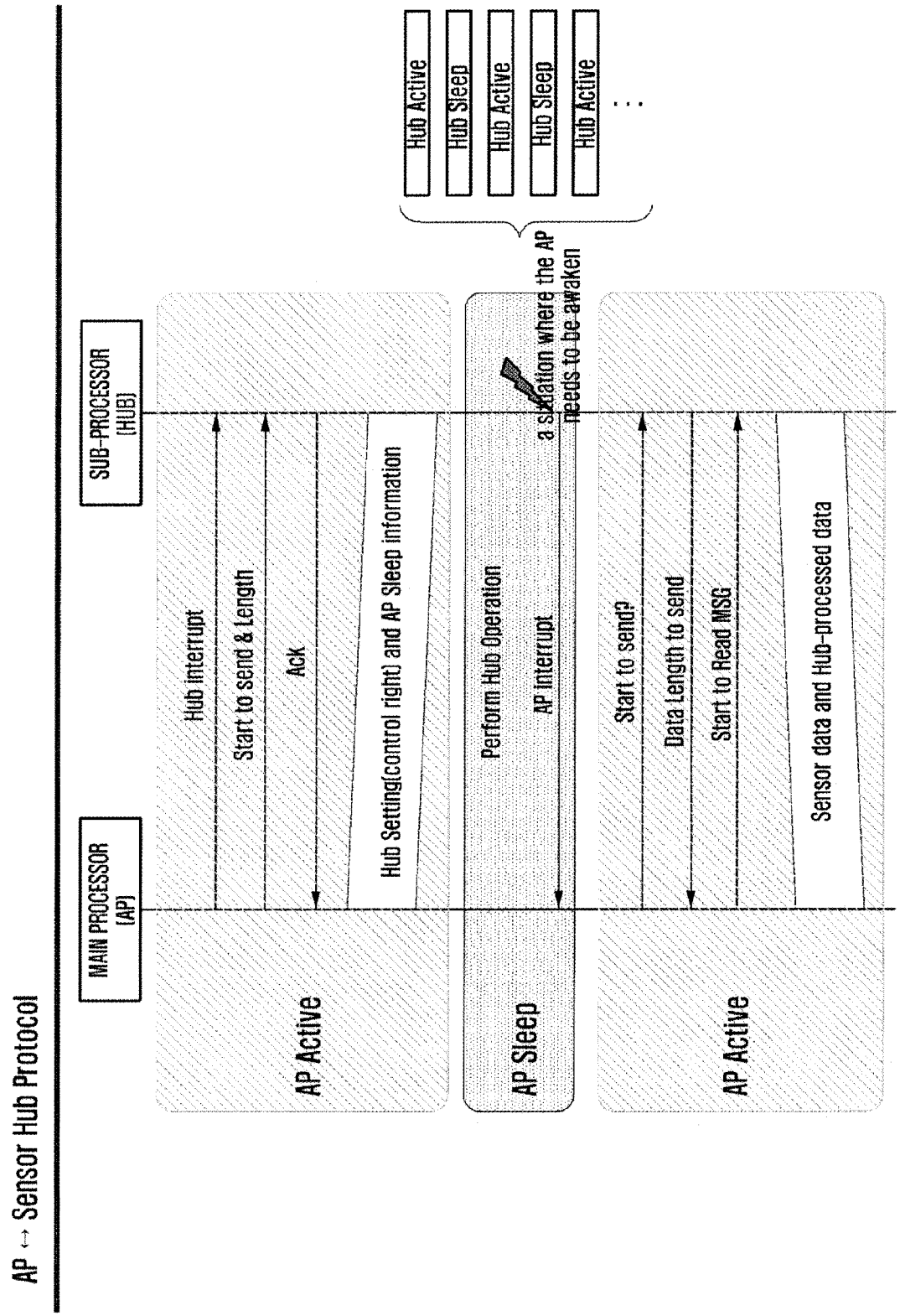
FIG. 3B is an exemplary overview of an AP Processor to Hub Processor Protocol according to an illustrative aspect of the present invention.

As shown in FIG. 3B, while the main processor is active, an exchange occurs between main processor and a sub-processor according to a HUB protocol. First, a hub interrupt is sent by the main processor to the sub-processor, and wherein the main processor starts to send length information. In turn, the sub-processor sends an acknowledgement back to the main processor. At this point, the hub (sub-processor) sets the control right and AP sleep information.

With continued reference to FIG. 3B, it can be seen that the sub-processor keeps varying states between active and sleep. When a situation arise where the main processor needs to be awakened, an AP interrupt id from the sub-processor to the main processor. Once the main processor is awakened, the main processor remains in an active state and starts to send information to the sub-processor. In turn, the sub-processor indicates to the main processor the data length to send. Next the main processor starts to read a message from sub-processor, which can comprise sensor data and sub-processed data.

FIG. 3C shows an example of a main processor to sub-processor (i.e. AP to Hub Protocol Message Frame) that can be used according to an exemplary aspect of the present invention.

Referring now to FIG. 3C, it is shown that an exemplary frame can be 8 bytes, with a command field commanded by the AP (main processor) to the Hub (sub-processor), a sensor number field specifying a particular sensor, s data type showing the content of the operand being transmitted, a data size field providing the actual data that follows. Each of the aforementioned parts of the message frame can be 1 byte in length, and the data and status can be 4 bytes each so as to total 8 bytes, for example.

Figure 3D:
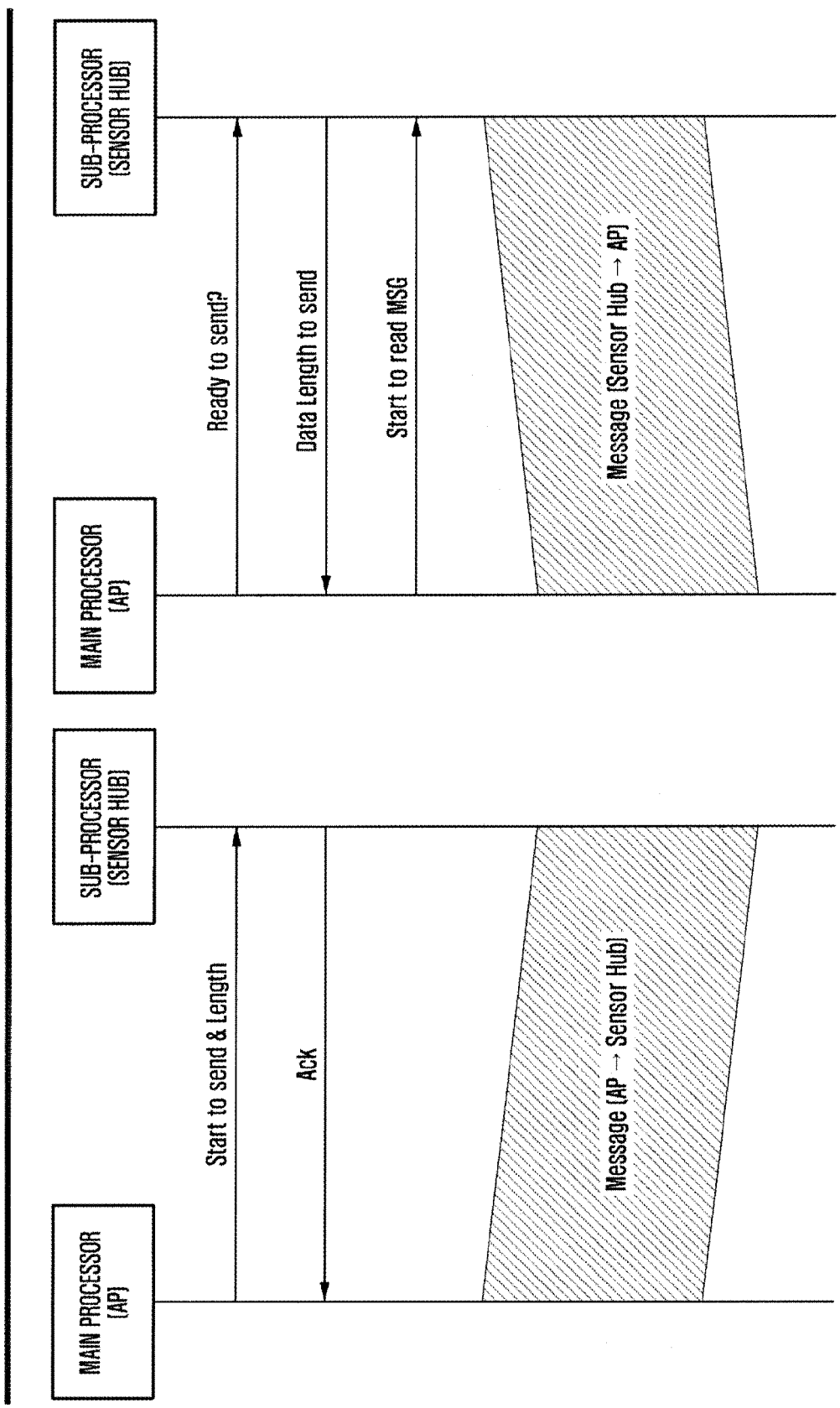
FIG. 3D is an example of an AP processor communicating with a second processor hub, according to an AP to Hub protocol that can be used with the present invention.

FIG. 3D shows another example of AP (main processor) to Hub (Sub-processor Protocol according to a non-limiting exemplary aspect of the present invention. These actions are similar to what is shown in FIG. 3B while the AP is in the active mode.

Figure 4:
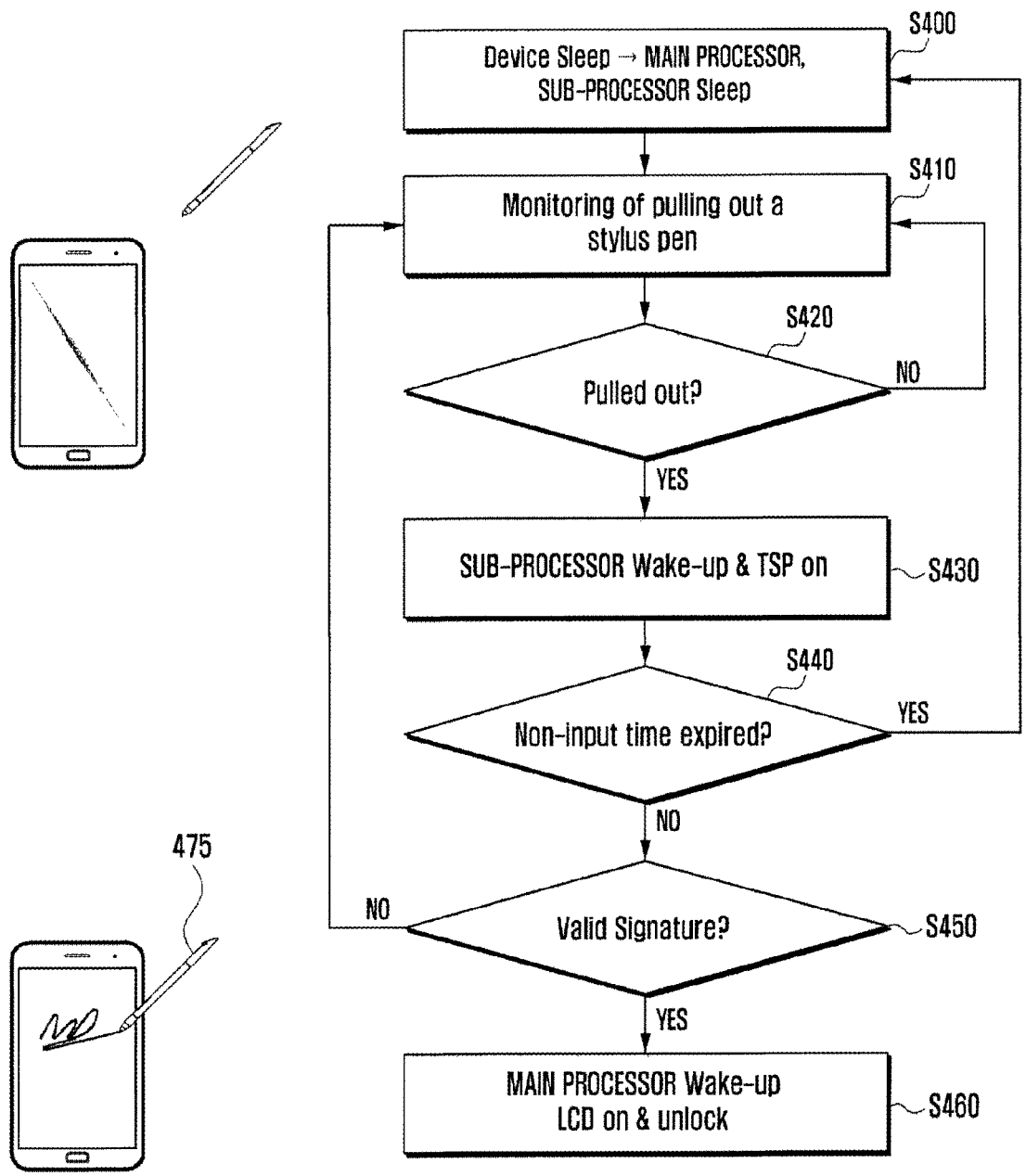
FIG. 4 shows a flowchart illustrating exemplary operation of a signature unlock based on stylus movement according to an exemplary aspect of the invention.

FIG. 4 shows a flowchart illustrating exemplary operation of a signature unlock based on stylus movement according to an exemplary aspect of the invention.

With reference to FIG. 4, at step 400, the main processor and sub-processor are in sleep mode. At step 410, the presence of a stylus pen 475 is monitored to determine whether the stylus pen has been removed from a holder on the electronic device. At step 420, when it is determined that the stylus pen is removed, sub-processor wakes up at 430. If at step 440, the non-input timer has expired, the main processor and sub-processor go back to sleep mode, otherwise, at step 450 it is determined whether a signature is valid, and if so, then main processor wakes up, and the display LCD is turned on and unlocked (step 460).

Figure 5:
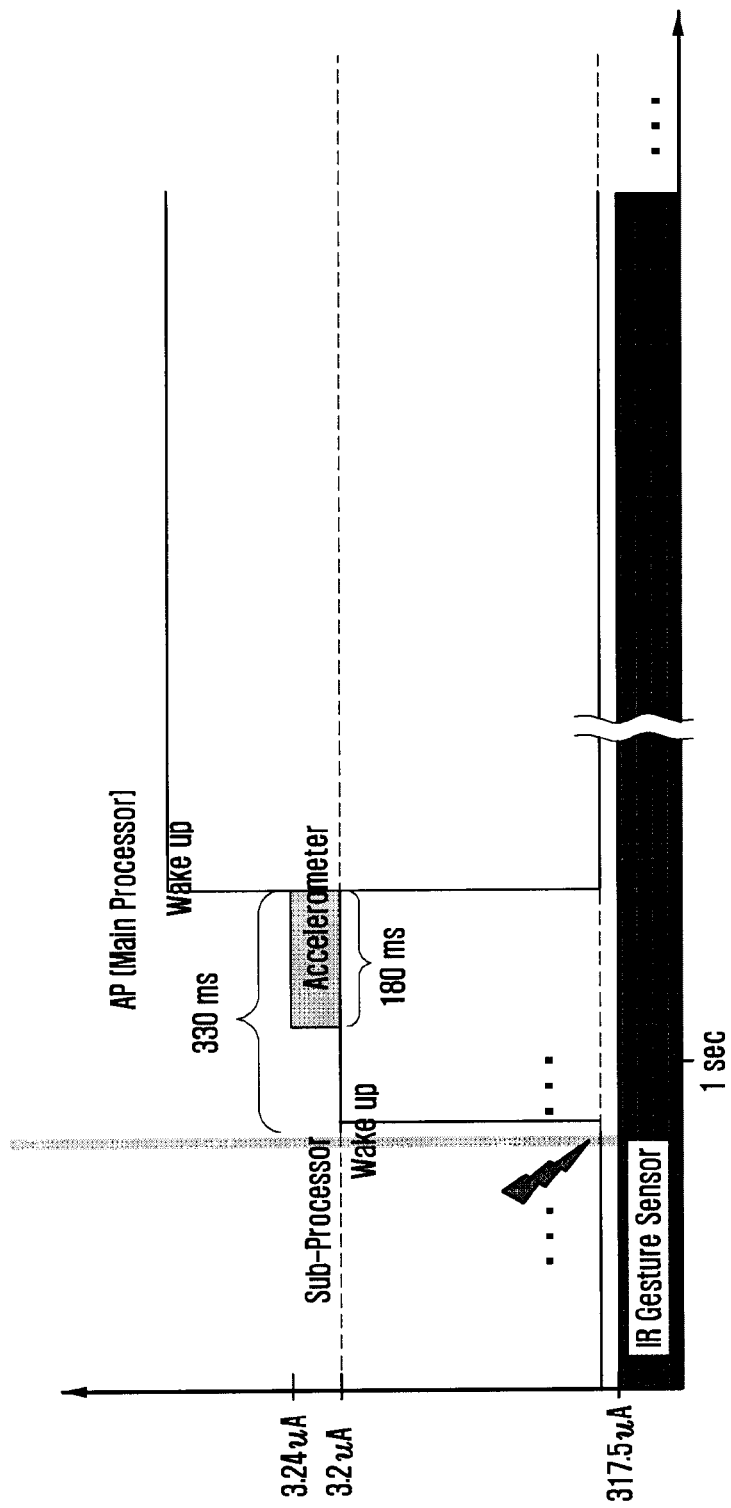
FIG. 5 shows a current profiling example according to an exemplary aspect of the invention.

FIG. 5 shows a current profiling example according to an exemplary aspect of the invention. In this particular non-limiting example, The X axis is time, and the Y-axis is current consumption which comprises milliamps and microamps.

As shown in FIG. 5, the IR gesture sensor (interrupt sensor) consumes at 317.5 uA of current. The sub-processor in this example consumes about 3.2 uA when awakened due to the IR gesture sensor sensing a change in the ambient condition. Within about 330 ms of waking up the sub-processor may wake up the main processor to perform a function, and upon doing so, the sub-processor goes back to sleep. The main processor consumes considerably more current than the sub-processor. Also, in the example of FIG. 5, it is shown that the accelerometer can cause the main processor to wake up within 180 ms.

Figure 6:
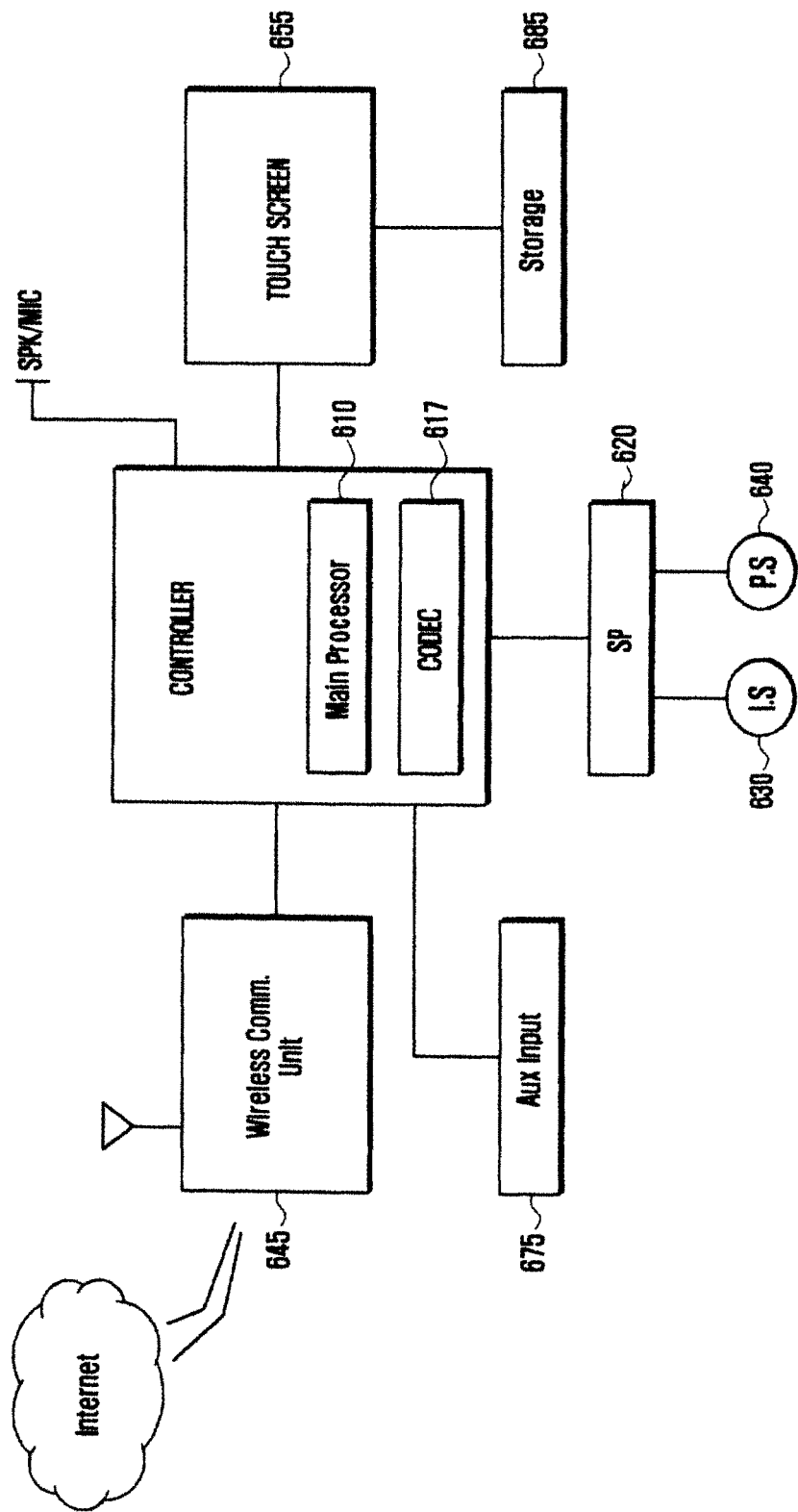
FIG. 6 shows an example of a wireless device incorporating the present invention.

FIG. 6 shows one possible example of a wireless device incorporating the present invention. An artisan understands and appreciates that a plurality of both wired and wireless devices can benefit from the claimed invention. Some non-limiting examples include smartphone, tablet, PDA, music player, etc. just to name a few examples. A controller includes the main processor 610 and a codec 617, the controller communicates with sensing processor 620. The interrupt sensor 630 and the polling sensor 640 are shown schematically, but their actual proximity to the controller us likely to be different than shown.

Touch screen 655 permits display and entry of data. Storage device 685 is in communication with the controller, and comprises a non-transitory machine readable medium.

Auxiliary input 675 can be anything from a keyboard to a mouse, and wireless communication device, shown as a single box, may be different hardware modules for transmitting in short range communication such as Near Field Communication, Bluetooth, WLAN, 802.11, RF communications, etc.

In the invention, the ambient environment is monitored by an interrupt sensor, so that the sub-processor and the main processor (application processor) can remain together in sleep mode. Not only does the invention save power, but provides the user with a convenience in that there is no requirement to push a button to activate/convert the device from a sleep mode back to a normal operating mode.

The sensing of a swiping near the device is sufficient to awake the device from sleep mode, or alternatively, shaking or waving the device, also restores the device to a normal operating state by waking it up.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as, flash, an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

We claim:

1. A method of waking up a main processor in an ultra-low power electronic device, the method comprising:
   monitoring for a predetermined condition by an interrupt sensor when a sub-processor that controls the interrupt sensor is in a sleep mode;
   sending by the interrupt sensor an interrupt signal to the sub-processor upon sensing a change in the predetermined condition being monitored, said sub-processor being configured to wake up from sleep mode upon receiving the interrupt signal and evaluate data received from the interrupt sensor;
   wherein when the sub-processor determines that the data received from the interrupt sensor has reached a predetermined threshold value or is within a predetermined range of validity, the sub-processor sending a signal to wake up a main processor that is coupled to the sub-processor, wherein the predetermined condition being monitored comprises an ambient environment of the electronic device, and wherein the interrupt sensor comprises an infrared (IR) gesture sensor that senses a hand wave gesture as a change in the ambient environment and returns the electronic device to an active status.

2. The method according to claim 1, wherein the interrupt sensor operates at an ultra-low power level.

3. The method according to claim 2, wherein the sub-processor comprises a sensing processor that operates at a low power level.

4. The method according to claim 1, wherein the predetermined condition being monitored comprises a gesture.

5. The method according to claim 1, wherein the predetermined condition being monitored comprises motion sensing.

6. The method according to claim 5, wherein, the predetermined condition being monitored comprises the electronic device being shaken or waved.

7. The method according to claim 5, wherein after motion is detected and the main processor is awakened, unlocking or operating the electronic device after determining receipt of a voice command.

8. The method according to claim 1, wherein the sub-processor comprises a Micro Controller Unit (MCU) and operates at a low power level that is less than a higher power level at which the main processor operates.

9. The method according to claim 1, wherein the sub-processor comprises a sensing processor, and both the main processor and the sensing processor are configured to go into a sleep mode until the interrupt sensor senses a change in the ambient environment and wakes the sensing processor, and the sensing processor wakes up the main processor when the sensing processor determines that the data received from the interrupt sensor has reached a predetermined threshold value or is within a predetermined range of validity.

10. The method according to claim 1, wherein the predetermined condition comprises an ambient environment of the electronic device, and the interrupt sensor monitors the ambient environment either periodically or continuously.

11. The method of claim 1, wherein the predetermined condition being monitored comprises an ambient environment of the electronic device, and wherein the interrupt sensor comprises a motion sensor that senses a motion of the electronic device as a change in the ambient environment.

12. The method according to claim 1, wherein an additional sensor comprising a polling sensor is in communication with the sub-processor to determine whether to wake the main processor when sensing data of the polling sensor is within a valid range.

13. The method according to claim 12, wherein the polling sensor operates only when the sub-processor is in the operating mode after being awakened by the interrupt sensor.

14. The method according to claim 13, wherein the polling sensor comprises an accelerometer.

15. The method of claim 1, wherein the electronic device comprises a portable communication terminal configured for wireless communication.

16. The method of claim 1, wherein the sub-processor is internalized in the main processor.

17. The method of claim 1, wherein a gesture proximity to be sensed by the IR gesture sensor is less than 15 cm.

18. The method of claim 1, wherein the predetermined condition comprises sensing a change in position of a stylus arranged partially within a holder or on a surface of the electronic device.

19. The method according to claim 1, wherein the sub-processor utilizes ⅕th or less than an operating power of the main processor.

20. The method according to claim 1, wherein the main processor comprises an application processor.

21. The method according to claim 1, wherein the sub-processor comprises one of a sensing processor, a sensor hub, and a Micro Controller Unit (MCU).

22. An ultra-low power wake up apparatus comprising:
a sub-processor including an interface for communicating with a main processor, said sub-processor having at least a sleep mode and an operating mode;
an interrupt sensor in communication with the sub-processor, said interrupt sensor monitors a predetermined condition when the sub-processor is in the sleep mode;
wherein said interrupt sensor sends an interrupt signal to said sub-processor upon sensing a change in the condition being monitored, said sub-processor being configured to wake up from the sleep mode and evaluate data provided from said interrupt sensor; and
wherein said sub-processor being further configured to send a signal over the communication interface to wake up the main processor when the sub-processor determines that the data received from the interrupt sensor is at a predetermined threshold value or within a predetermined range of validity, and wherein the predetermined condition being monitored comprises an ambient environment of the apparatus, and wherein the interrupt sensor comprises an infrared (IR) gesture sensor that senses a wave of a user hand as a change in the ambient environment to return the apparatus to an active status.

23. The apparatus according to claim 22, wherein the sub-processor operates at a low power level, and the interrupt sensor operates at an ultra-low power level.

24. The apparatus according to claim 22, wherein the main processor comprises an application processor coupled to the sub-processor via the communication interface that operates at a power level that is higher than a power level of the sub-processor,
wherein the sub-processor comprises a micro control unit (MCU) and operates at one of an ultra-low power level or a low power level that is less than a power level at which the application processor operates.

25. The apparatus according to claim 24, wherein the application processor includes a sleep mode and an operating mode, and wherein both the application processor and the sub-processor are configured to go into a sleep mode until the interrupt sensor senses a change in the ambient environment and wakes the sub-processor.

26. The apparatus according to claim 22, wherein the predetermined condition comprises an ambient environment of the apparatus, and the interrupt sensors monitors the ambient environment one of periodically and continuously.

27. The apparatus according to claim 22, wherein the interrupt sensor is configured to operate at an ultra-low power level and senses whether a change in the predetermined condition being monitored occurs, and the interrupt sensor sends an interrupt to the sub-processor upon detection of the change in the predetermined condition being monitored.

28. The apparatus according to claim 22, wherein the predetermined condition being monitored comprises an ambient environment of the apparatus, and wherein the interrupt sensor additionally includes a motion sensor that senses a motion as a change in the ambient environment.

29. The apparatus of claim 28, wherein the motion sensed as the predetermined condition comprises the apparatus being shaken or waved.

30. The apparatus of claim 29, wherein after the motion is sensed as the predetermined condition, the main processor determines whether a voice input is received and in response unlocks or renders the apparatus into a fully operative state.

31. The apparatus according to claim 22, further comprising an additional sensor in communication with the sub-processor, wherein the sub-processor compares an output of the interrupt sensor with an output of the additional sensor to determine whether to wake the main processor via the communication interface between the sensing processor and the main processor.

32. The apparatus according to claim 31, wherein the additional sensor comprises a polling sensor that operates only when the sub-processor is in the operating mode and not when the sub-processor is in the sleep mode.

33. The apparatus according to claim 32, wherein the polling sensor comprises an accelerometer.

34. The apparatus of claim 22, wherein said apparatus comprises a portable communication terminal configured for wireless communication comprising:
a controller including the main processor and the sub-processor;
a non-transitory memory;
an RF communication unit coupled to the controller;
a touchscreen;
a network communication unit; and
wherein the interrupt sensor sends the interrupt signal to the main processor upon detecting a change in the ambient environment of the portable communication terminal.

35. The apparatus of claim 22, wherein the sub-processor is internalized in the main processor.

36. The apparatus of claim 22, wherein a gesture proximity to be sensed by the IR gesture sensor is less than 15 cm.

37. The apparatus of claim 22, wherein the predetermined condition comprises sensing a change in position of a stylus arranged partially within a holder or on a surface of the apparatus.

38. The apparatus of claim 22, wherein the main processor comprises an application processor.

39. The apparatus of claim 22, wherein the sub-processor comprises one of a sensing processor, a sensor hub, and a Micro Controller Unit (MCU).

* * * * *